(12) United States Patent
Stokes et al.

(10) Patent No.: US 8,680,429 B2
(45) Date of Patent: Mar. 25, 2014

(54) LASER BEAM SCRIBING SYSTEM

(75) Inventors: Brian Patrick Stokes, Windham, NH (US); Robert T. Milkowski, Jr., Shirley, MA (US); Carl Brian Candiloro, Hudson, MA (US)

(73) Assignee: Instrument Associates LLC, Hudson, NH (US)

( * ) Notice: Subject to any disclaimer, the term of this patent is extended or adjusted under 35 U.S.C. 154(b) by 505 days.

(21) Appl. No.: 12/942,493

(22) Filed: Nov. 9, 2010

(65) Prior Publication Data

US 2011/0108531 A1 May 12, 2011

Related U.S. Application Data

(60) Provisional application No. 61/259,876, filed on Nov. 10, 2009.

(51) Int. Cl.
*B23K 26/00* (2006.01)
*B23K 26/08* (2006.01)

(52) U.S. Cl.
USPC .................................. 219/121.69; 219/121.78

(58) Field of Classification Search
USPC ............ 219/121.6–121.83; 250/458.1–461.2; 438/482–487
See application file for complete search history.

(56) References Cited

U.S. PATENT DOCUMENTS

| 5,459,325 A * | 10/1995 | Hueton et al. .............. 250/458.1 |
| 7,642,482 B2 * | 1/2010 | Takami et al. ........... 219/121.65 |
| 2006/0124616 A1 * | 6/2006 | Hsu ......................... 219/121.67 |

* cited by examiner

*Primary Examiner* — Sang Y Paik
(74) *Attorney, Agent, or Firm* — Cesari and McKenna, LLP; Patricia A. Sheehan (57) ABSTRACT

Techniques are described for laser-scribing a feature on a surface in relation to a reference feature on that surface, such as a feature created by a previous placement of the laser beam. In particular, using a laser beam focusing and deflection system to direct a laser scribing spot onto a surface through an optical path, an optical detection system provides reliable detection of the position of an existing feature on the surface as viewed through the optical path of the deflection system. Based on feedback provided from the detection system to the deflection system, the position of the laser beam may be modified through the deflection system in relation to the viewed feature to scribe a subsequent feature on the surface which tracks the existing feature in real time. A method of scribing to accomplish the objectives is also disclosed.

24 Claims, 8 Drawing Sheets

LASER BEAM SCRIBING SYSTEM

CROSS REFERENCE TO RELATED APPLICATIONS

The present application claims priority to U.S. Provisional Application No. 61/259,876, filed on Nov. 10, 2009 by Stokes et al., for LASER BEAM PLACEMENT SYSTEM, the contents of which are hereby incorporated by reference.

BACKGROUND OF THE INVENTION

1. Field of the Invention

The present invention relates generally to the use of lasers, and more particularly to placement of their beams on a surface.

2. Background Information

A laser is a device that emits light (electromagnetic radiation) through stimulated emission. Typically, lasers emit light that is spatially coherent, meaning the light is emitted as a narrow, low-divergence beam, or is converted into one through the use of optical components such as lenses. Various uses of lasers have been developed since their inception, including, among other things, illuminating a surface, heating a surface (e.g., for printers), transmitting signals/data, and scribing (etching) or cutting a surface with a sufficiently powerful laser.

Often, precise placement of laser beams on an object or surface is required, such as during manufacturing processes, to create mechanical or electrical features by heating, scribing, cutting, etc. In some situations, the primary requirement is that the relative position of these features be separated by a specific distance, for instance, being as close as possible without risk of superposition or overlap of the features. For many of these situations, the exact placement of an initial feature is less important than the placement of additional features in relation to the initial feature.

As an example, in the field of solar panel manufacturing, thin films (e.g., monolithic) which constitute the active layers of photovoltaic solar panels may be scribed to divide coated areas into regions that are electrically isolated, by selective removal of coating material. Lasers are commonly used to make these scribes, where the laser beam scribe is focused to a "waist" (or "spot") that is scanned along the desired path of the scribe, removing some or all of the layers which make up the photovoltaic coating. Typically, three or more scribes are required at different phases in the manufacturing process, for example, when isolating regions of a bottom conductive coating, creating an interconnect path or "via" to a top conductive coating, and isolating regions of the top conductive coating, e.g., repeated roughly every centimeter, resulting in a series electrical connections between individual solar panel cells. In this particular circumstance, it is essential to the operation of the solar panel that these scribes do not touch or cross one another. It is also desirable to place these scribes as close to one another as possible, because the photovoltaic material in the space between the scribes is non-functional in the generation of electricity, and therefore reduces the solar panel efficiency and electrical output.

There are a number of methods for placing and/or moving a laser spot along a surface. In general, these methods rely on repeatedly detecting (registering) the location of a workpiece/object, and placing the laser beam at a predetermined position on its surface based on the registrations. This approach, however, leads to an accumulation of positional tolerances which may be large relative to the desired spacing between the initial placement/pass and subsequent placements/passes of the scribe. To accommodate the positional tolerances, current laser beam placement techniques require that the nominal spacing between placements be increased in order to insure that subsequent placements do not overlap. For example, assume that a laser scribe placement has a positional tolerance of +/−2% on the surface of a workpiece. In order to account for the maximum degree of error to prevent overlap (e.g., 2% closer in each direction), the two scribes would need to be placed 4% apart. This planned 4% spacing could, in the extreme, result in scribes that are either touching (each being 2% closer to the other after the planned 4% offset), or scribes that are far apart (e.g., 8% apart, each being 2% further away from each other after the planned 4% offset).

As noted, for certain uses of the lasers, this varied placement between spots (e.g., scribes) on a surface may be undesirable or inefficient. In particular, it is often true that the primary requirement is that the laser beams be placed precisely relative to an entity on the surface, such as a previous scribe, while their absolute location on the surface is of secondary importance. There remains a need, therefore, for a technique that precisely places laser beams on a surface relative to other entities on the surface, particularly to entities created by previous placements of the beams.

SUMMARY OF THE INVENTION

The present invention is directed to a technique for precisely placing a laser beam on an object in relation to a reference feature or entity, such as an entity created by a previous placement of the beam. In particular, according to one or more embodiments of the invention using a laser beam focusing and deflection system to direct a laser spot onto a surface through an optical path, an optical detection system provides reliable detection of the position of an existing entity on the surface as viewed through the optical path of the deflection system. Based on feedback provided from the detection system to the deflection system, the position of the laser beam may be modified through the deflection system in relation to the viewed entity or feature.

In accordance with illustrative embodiments, non-contact methods of determining an existing entity's relative location are provided. For instance, various techniques for illuminating the object in a manner to generate a detectable contrast between the existing entities and the surface itself are described. Further, in illustrative embodiments, the detection system is capable of providing feedback to a laser placement system with sufficient bandwidth to guide the position of the laser spot in real time at high scanning speeds.

In one example embodiment, the entity detection can be used to determine the position of a previously formed scribe and place a subsequent scribe adjacent to it, closely spaced, regardless of the previous scribe's position on the surface. For example, during an etching operation, a first scribe may be placed on the surface based on a predetermined geometry, in the form of lines. When a subsequent line is to be created adjacent to an existing line, an illumination system may be deployed and the detection system views the position of the existing line through the same optical path as the deflection system. The beam deflection system may then direct the laser spot along a nominal path and its position is adjusted according to the feedback from the detector to scribe the subsequent line.

Advantageously, the techniques described herein precisely place laser beams on a surface relative to other entities on the surface, particularly along the length of the entities. The placed laser beams may be used for imaging, cutting, scribing, heating, etc., and may be based on objects created by previous placements of the lasers (previous images, cuts, scribes, etc.) or other objects (e.g., edges, holes, designs, components, etc.). Specifically, the precise placement of the laser beams is relative to the precisely detected location of an already existing entity on the surface, using the same optical path to detect the entity and deflect the laser beam to minimize positional tolerance concerns, with less emphasis on the absolute locations of the entity and laser beam on the surface.

BRIEF DESCRIPTION OF THE DRAWINGS

The invention and its advantages may be better understood by referring to the following description in conjunction with the following accompanying drawings in which like reference numerals indicate identically or functionally similar elements.

DETAILED DESCRIPTION OF ILLUSTRATIVE EMBODIMENTS

Figure 1:
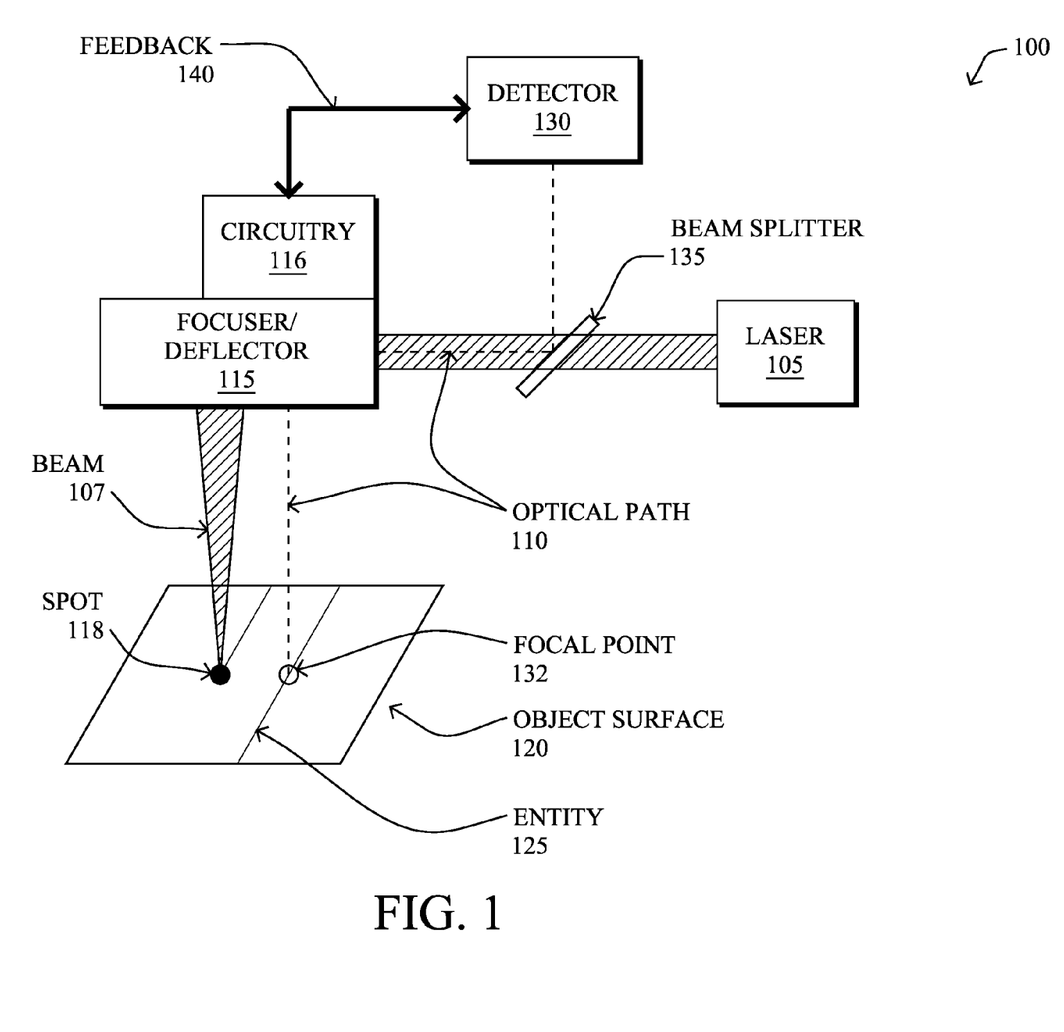
FIG. 1 illustrates a laser beam placement system in accordance with the present invention.

FIG. 1 illustrates a laser beam placement system 100 in accordance with one or more embodiments of the present invention described herein to precisely place a laser beam on an object in relation to a reference feature or entity, such as an entity created by a previous placement of the laser beam. In particular, system 100 may comprise a laser 105 that generates a laser beam 107, which passes through an optical path 110 consisting of various focusing and deflecting systems ("focuser/deflector" 115). A circuitry 116 is presented configured to direct a laser waist or spot 118 onto the object's surface 120 through manipulation of the focuser/deflector 115 of optical path 110. Example objects may include metal, plastic or glass substrates or workpieces, printing materials, silicon wafers (e.g., for processor manufacturing), circuit boards, etc.

In addition, an optical detection system (detector) 130 may be used to provide a reliable measurement of the position of an existing feature or entity 125 on the object surface 120 as viewed from a focal point 132 through the optical path 110 of the deflection system 115. The non-contact determination and positioning of the existing entity's location allows the laser beam placement system 100 to place the laser beam 107 relative to the existing entity 125 at a precise offset from that entity, regardless of the entity's placement on the surface. Because the detector 130 utilizes the same optical path 110 of the focuser/deflector 115, the detected location through that optical path is very accurate in relation to placement of the laser's spot 118. For instance, if the initial entity 125 was created by the laser at a displaced mechanical tolerance "x", then the detector 130 has the same displaced mechanical tolerance "x". As such, any difference in position from the detected entity 125 within focal point 132 and the laser beam's placement (spot 118) may be precisely controlled in relation to each other, regardless of the position of the entity on the surface.

According to the present invention, therefore, a feedback circuit 140 may provide feedback from the detection system 130 to the deflection system 115 to modify the placement of the laser beam 107 and spot 118 according to desired offset characteristics in relation to the viewed entity 125. For instance, the detection system may provide feedback to the deflection system to allow the deflection system to track or follow a previous scribe while making a subsequent scribe and maintaining the desired offset distance between the previously scribe and the scribe currently being formed. That is, the beam deflection system directs the laser spot along a nominal path, and its position can be adjusted according to the feedback from the detector to maintain the desired offset. Notably, for real-time adjustments, the feedback circuit is illustratively capable of providing feedback for the laser placement system 100 with sufficient bandwidth to guide the position of the laser spot at high scanning speeds. The feedback circuit may comprise analog or digital signals, which are generally interconnected with the deflection system controller/circuitry 116. In one or more embodiments, the feedback circuit may result in separate control of each axis of the deflection system (e.g., each minor or other optical device), such as a single axis of interest (e.g., where horizontal spacing is paramount, but vertical spacing is not, etc.).

In addition, in one or more embodiments, the detection system 130 may comprise a fixed optical arrangement, configured to receive (e.g., view) a focal point 132 at a given offset from the spot 118 of laser beam 107 through the shared optical path 110. For tracking generally straight line entities 125 along a surface 120, for example, geometrical variances need not be countered to maintain the desired offset. However, for one or more alternative embodiments, the detection system 130 may comprise a controlled optical arrangement in order to adjust the corresponding geometry of the received focal point in order to account for the variable angular orientation of the laser through the shared optical path 110. In other words, tracing a line (feature 125) with focal point 132 may consist of keeping the laser's spot 118 to one side of the line, tracing a shape (e.g., open or closed polygons, curved line, circles, etc.) may require that the focal point 132 and spot 118 change their positioning with respect to one another to maintain the desired offset, possibly changing sides (e.g., from the focal point 132 being on the right of the spot to then being on its left, or top, or bottom, etc. in order to move the spot 118 equidistantly around the entity 125). Accordingly, detection system 130 may be configured with corresponding circuitry, control, and/or optics (e.g., possibly, though not necessarily including beam splitter 135) to adjust the orientation of the focal point 132 with respect to the spot 118, while sharing the optical path 110 of the laser beam 107.

Any suitable types of lasers 105 that require precise placement in relation to an entity on a surface 120 may be used in accordance with the embodiments herein. For instance, these types of lasers comprise, among others, lasers used for imaging, cutting, scribing, heating (e.g., laser printers), etc. For example, scribing lasers may be used to selectively modify or remove material from a surface 120 through an optical scanning system which receives the output of the laser and focuses it to a waist or spot incident on a surface 120 sufficiently intense to ablate (etch) the surface material. One such use is for etching during solar panel manufacturing, as described herein, though many other uses exist.

Depending upon the characteristics of the laser 105, as well as of the detector 130, various types of beam splitting optics (splitters) 135 may be used to allow the detector to utilize the same optical path 110 as the laser. For instance, an optical wavelength filter, a spatial filter, or a dichroic mirror may be used to isolate a detection wavelength from the laser's wavelength and/or other unwanted wavelengths present in the field of view. Notably, in the event there is a protective window (not shown) between the focuser/deflector 115 and the surface 120 (e.g., to prevent the laser beam from reflecting off the surface), then the detection wavelength must be able to penetrate the protective window to reach the detector 130 through the optical path 110.

There may be situations where it is difficult to distinguish light caused by the laser, such as light emitted from plasma produced by laser ablation, from the light used to measure the position of the laser. In other words, the light caused by the laser may be difficult to separate from the light used to measure the laser beam's position by simply using a filter or dichroic mirror along the same optical path 110. To counter this effect, according to one or more embodiments herein, an initial position determination pass may be performed with the detector 130 only, (without using/firing the laser 105) to map the location of the existing feature 125 (e.g., a previous scribe). Data related to the position determination may then be buffered, such that a subsequent pass could be made to perform the laser operation (e.g., firing the laser to form a second scribe). While this technique may require additional time, it would be able to optically discriminate the two light sources. Alternatively, in the case of a pulsed laser, a time division technique may be used so that position determination measurements are made by the detector 130 between pulses of the laser, such that the light caused by the laser (e.g., from resultant plasma) is either not present or is reduced in magnitude during the actual measurements.

Circuitry for the detector 130, focuser/deflector 115 (circuitry 116), and/or feedback circuitry 140 may comprise known logic circuits, hardware, firmware, a processor, memory, software programs, data structures, an operating system, etc. Further, it will be apparent to those skilled in the art that other types of processors and memory, including various computer-readable media, may be used to store and execute program instructions pertaining to the inventive technique described herein. Note that certain embodiments of the present invention may also be configured with a non-processor feedback loop, such as a simple feedback signal from sensing devices (described below) indicating direct tracking movement in one direction or the other.

Generally, the laser beam deflection system 115 may be designed according to different styles of laser placement. For instance, in certain embodiments, the focuser/deflector 115 may take the form of one or more rotatable mirrors whose angular position is used to determine the position of the laser spot 118 on a surface 120, and move it along the surface. Conversely, the focuser/deflector may comprise fixed optics with a given focal point, and the laser focuser/deflector may be moved in its fixed orientation in relation to the underlying surface. Regardless of the type of laser beam placement system, it may be beneficial to include fixed optics (e.g., telecentric lenses, flat field scanning lenses, f-theta lenses, etc.) or movable optics which insure the laser beam's focused waist is located at the surface regardless of the position of the spot 118 as determined by the deflection system.

Figure 2A:
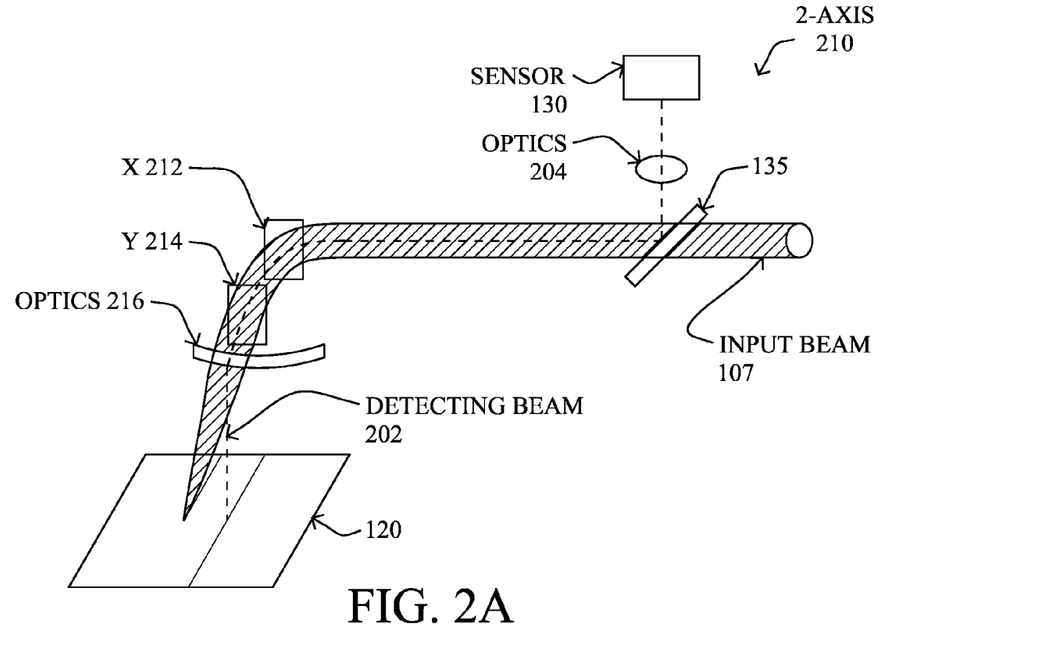
FIGS. 2A-2C illustrate laser designs that may be used with the present invention.
Figure 2B:
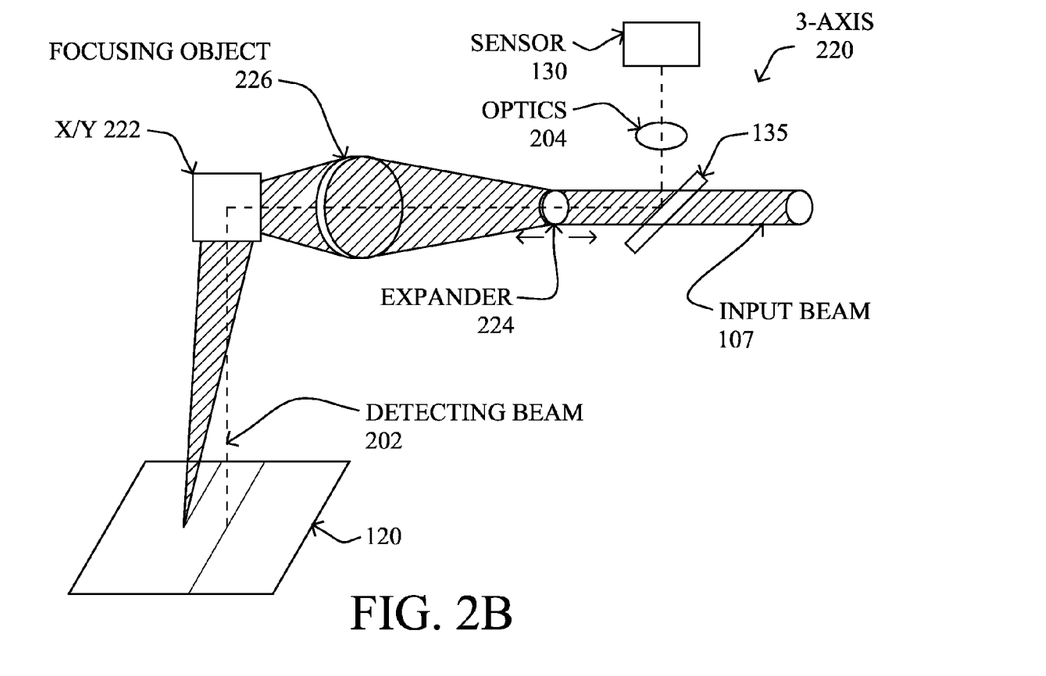
Figure 2C:
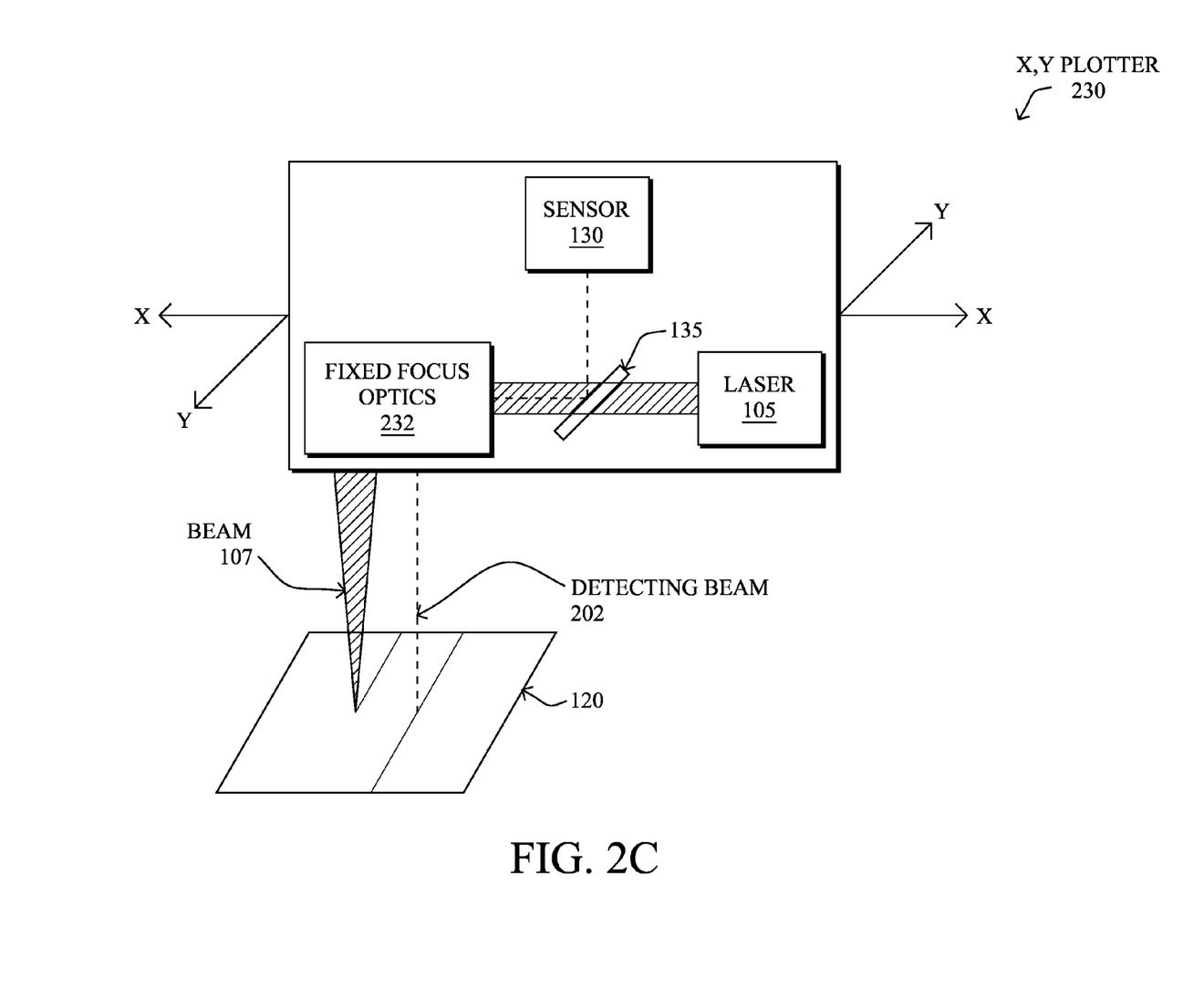

FIG. 2A illustrates a simple 2-axis scan head 210, having an "X mirror" 212 and a "Y minor" 214 to direct a laser beam 107 to a surface 120. Various optics 216 may be used to keep the focus of the laser on the surface, as may be appreciated by those skilled in the art. As shown, the detecting "beam" 202 follows the laser's optical path (110) to beam splitter 135, being directed to sensor optics 204 and sensor/detector 130. As an alternative, FIG. 2B illustrates a 3-axis scan head 220 that can focus the laser beam's waist on the surface 120 at any desired elevation (e.g., a flat surface). For instance, the two-dimensional x-y scanning mechanism (e.g., minors) 222 may be placed after a moveable expander lens 224 and a focusing objective lens 226, allowing for the adjustable focusing of the waist (spot 118) on the surface regardless of x-y position of the laser. As a further alternative, FIG. 2C illustrates an x,y plotter 230, which may move the (generally) fixed focused laser optics 232 to a particular location on the surface 120 (or, conversely, the optics 232 may remain stationary, and the workpiece surface moves in relation to the optics. In one or more embodiments, it is also possible to have movable optics in a movable laser system, such that physical and optical adjustments may be made. Notably, in any embodiment corresponding to a particular laser type (e.g., FIGS. 2A-2C, merely illustrative examples), the focused/deflected optical path 110 is the same for the laser beam 107 and for the detection "beam" 202, regardless of the physical arrangement or location of the laser system, such that the sensor optics 204 direct the same "view" of the surface to the sensor/detector 130 as "seen" by the laser.

Figure 3A:
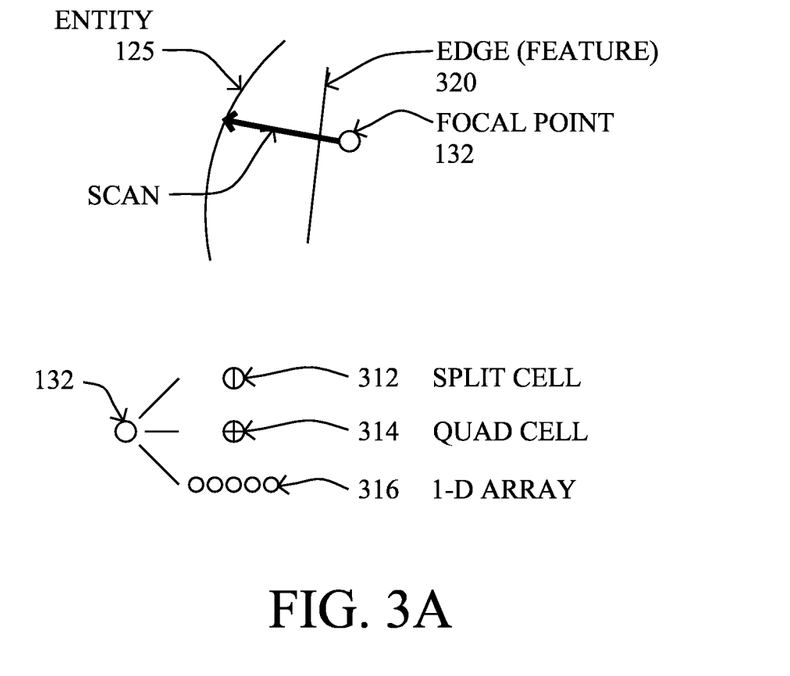
FIGS. 3A-3E illustrate entity tracking and laser beam placement in accordance with the present invention.

In accordance with one or more embodiments of the present invention, the process of detecting an entity 125 may begin generally in FIG. 3A, where a focal point 132 of the detector 130 scans the surface 120 to locate the entity. For instance, by adjusting the focus/deflection of the laser system, the focal point 132 may be moved along the surface. Generally, there may be a rough estimation of the entity's location on the surface, such as a previously created entity (e.g., scribes, cuts, etc.), or else the scanning may begin without any initial positioning assistance. Note that while scanning for the entity, other features 320 of the surface 120 may be detected, such as edges, imperfections, etc., and such features should be distinguished from the actual entities 125 by the detector 130, accordingly. In its simplest form, this distinction could merely be ignoring a first detected contrast, knowing that the scan crosses an edge of the surface, and then using a second detected contrast as the entity 125. Other techniques may also be used, such as visual recognition distinctions, color distinctions, etc.

Particularly, in accordance with the techniques herein, detector 130 may be configured to detect the entity 125 on the surface 120 based on various techniques, generally by detecting a contrast between the entity and surface, though more advanced visual recognition systems may be used. For instance, as shown in FIG. 3A, the detection system may comprise a photodiode, such as a split cell (312) or quad cell (314) photodiode, resulting in a focal point 132 that can be used for detecting and tracking an entity, as may be appreciated by those skilled in the art of photodiodes. For example, a split cell photodiode detects the position of an entity (e.g., a contrasted line) within its view, such that if one cell or the other is detecting a higher percentage of the entity's presence (e.g., light level), then the tracking system (detector 130 through optical path 110) should be adjusted to re-center (equally distribute) the contrast between the two cells. A similar technique applies to quad cell photodiodes. Alternatively, the detection system may be a line scan camera, such as a single line (one-dimensional array) of sensors, so that the focal point 132 is embodied as an array of focal points 316, the goal of which being to center the entity 125 within the array, similar to the adjustments made using a split cell photodiode. Note that the focal points 132 are shown as round focal points as an illustrative example, and are not meant to limit the scope of the present invention.

Referring again to the initial scanning process of FIG. 3A, to locate the reference entity 125 that is a line (e.g., a scribe), the detector 130 may scan in a direction generally meant to cross the line (e.g., perpendicular), overlooking the edge 320 as mentioned above. The detector 130 is configured to scan the surface until the desired entity 125 is found, which may be objects created by the lasers such as previous images, cuts, scribes, etc., or other objects, such as edges, holes, designs, lines, other laser lines, components, etc. For example, while one embodiment is designed to track a previous scribe on the surface, other embodiments may be used for tracking an outer edge of the surface, a drawing on the surface (e.g., a hand drawing for custom designed steel/aluminum cutting), etc.

Figure 3B:
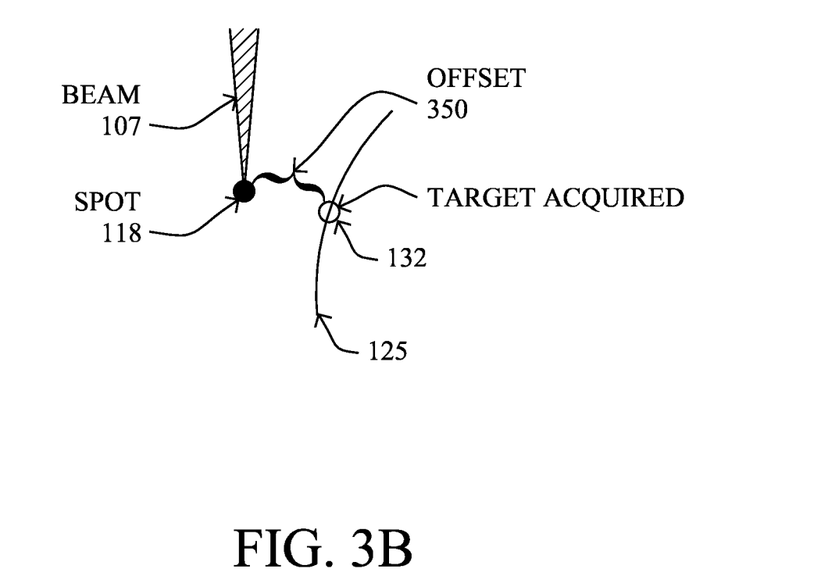
Figure 3C:
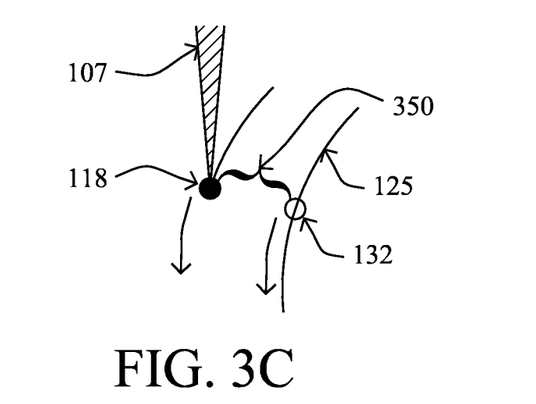

Once the entity (e.g., scribe) has been located, then in FIG. 3B the laser beam 107 may be focused/deflected (placed) to create a spot 118 at a precise offset 350 from the detected entity 125. For certain uses, such as chip manufacturing or solar cell manufacturing, the offset 350 may be mere microns. Conversely, for other applications, the offset need not be quite so microscopic, though still precise. The laser operation (cutting, drilling, etc.) may then be performed at the desired offset 350 from the detected entity 125. As shown in FIG. 3C, the laser operation may track the entity 125 to maintain the precise offset from the entity. (Alternatively, as noted above, the entity "tracking" may be based on stored/buffered positional information.) For instance, the scanning mechanism which focuses the laser may move the spot 118 along a path, such as to precisely scribe (e.g., remove coatings) along narrow lines which are closely and evenly spaced. The tracked entity may be a straight line, curved line, a shape, etc., and any deviation in the entity can be precisely followed, alleviating the need for positional tolerance adjustments at the onset.

Figure 3D:
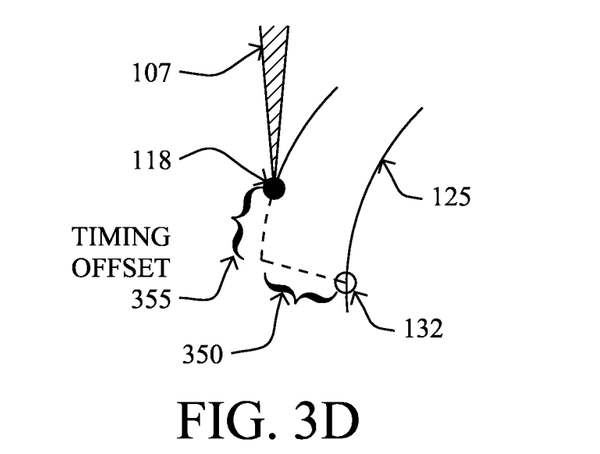

The tracking process may be designed for very fast laser operations, e.g., in order to prevent slowing a manufacturing process, such as by designing the bandwidth of the feedback circuit 140 to handle high amounts of data and processing. For embodiments without independently adjustable detection system optics, the system may maintain a generally orthogonal orientation between the focal point 132 and spot 118 with respect to the tracked entity, and may perform substantially immediate correctional adjustments to track the entities 125, accordingly. In addition, in one or more alternative embodiments for independently adjustable detection system optics, as described above, a timing offset may be included between the detector 130 and focuser/deflector 115 (circuitry 116). For example, as shown in FIG. 3D, a timing offset 355 may be configured such that the position of the detected entity 125 is used for placing a spot 118 at a trailing/later time. In other words, the system 100 may be designed with a suitable lead time to allow for propagation delays in the circuitry, as well as for processing/computing time, in order to reposition the laser spot according to changes in an advance-tracked entity. This arrangement is particularly suited for occasions where substantial changes may occur in the position/direction of a tracked entity.

Notably, in the event of a "broken" entity, such as following a line or scribe that is undetectable at points or otherwise disconnected, then the laser operation being performed in relation to the entity may either search further for the entity, create an error (e.g., stopping the operation), or may continue based on the expected travel of the entity (e.g., a straight line, a continued curve, etc.), such that the entity may be rediscovered or otherwise allowing the laser operation to be performed as a best effort attempt.

According to one or more embodiments of the present invention, subsequent laser operations (scribes, cuts, heatings, etc.) may take place based on a newly created entity (e.g., a previous scribe, cut, etc.) with the same (or different) offset, or, alternatively, based on the initial entity 125 with a new (different) offset 350. For instance, each time a new placement occurs (e.g., a subsequent scribe), the new operation may be based on the same entity as a previous operation, but this time with a new offset. In this manner, multiple, e.g., parallel, lines/spots may be placed on the surface from an initial entity on the surface.

Figure 3E:
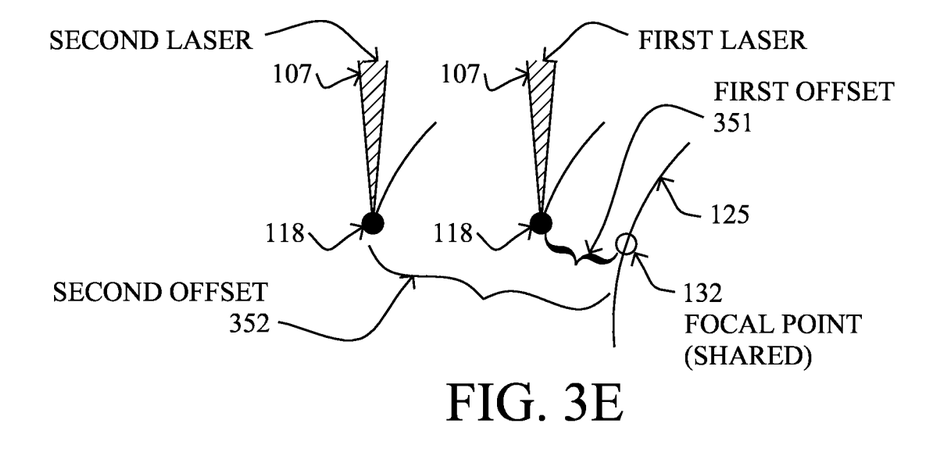

Notably, in certain illustrative embodiments, each laser operation may be performed using one detector 130 for each spot 118. However, in alternative embodiments, multiple spots 118 may be created using independent focusers/deflectors 125 and a common detector 130 (and shared feedback system 140). For instance, as shown in FIG. 3E, multiple spots 118 use the same focal point 132 (from a same detector 130) to perform separate laser operations at separate offsets 350 (351 and 352). Further, while single laser operations have generally been described, multiple laser operations, having independent and/or shared detectors 130, may be performed simultaneously, such as multiple laser systems operating on an assembly line.

In accordance with the present invention, sufficient detectable contrast should generally exist between the feature 125 and the surface 120 in order for the detector 130 to distinguish between them. For instance, when scribing into a surface, such as glass, it may be difficult to "see" the previous scribe. As such, one or more embodiments of the present invention may provide various techniques for illuminating the surface in a manner to generate a detectable contrast between the existing entities (e.g., previous scribes or other features) and unaltered regions of the surface itself. In this manner, the position of the contrasting regions may be detected by the detector 130, through the deflection system 115, relative to the instantaneous location of the laser spot 118.

Figure 4A:
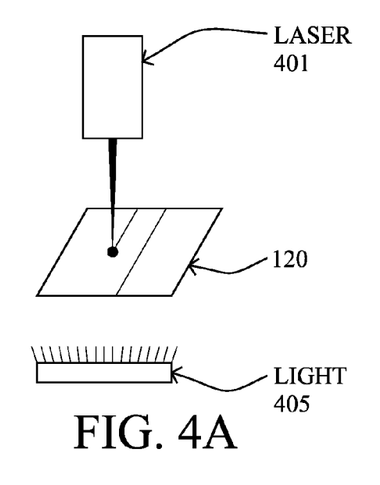
FIGS. 4A-4D illustrate lighting arrangements that may be used in accordance with the present invention.
Figure 4B:
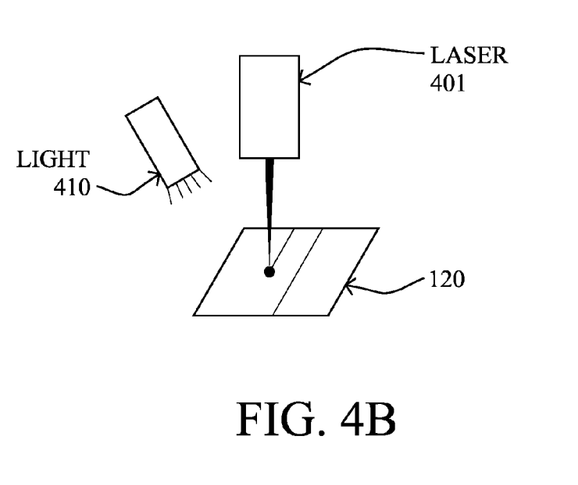
Figure 4C:
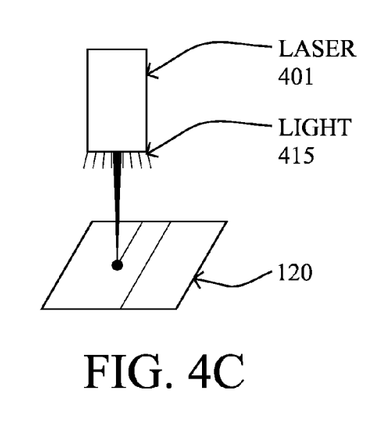

According to a first illustrative embodiment, as shown in FIG. 4A, a light source 405 may be placed behind a transparent surface 120 relative to the beam delivery system (laser and detection components) 401. The corresponding illumination incident on the surface is thus transmitted through the surface 120 to the detector (401). FIG. 4B, illustrates another embodiment, where the illumination is incident on the surface 120 from a light source 410 disposed in front of the surface 120, e.g., adjacent to the beam delivery system 401. Further, in another embodiment shown in FIG. 4C, illumination may be incident on the surface 120 through the optical path of the beam delivery system 401. That is, the beam delivery/deflection system 401 may further have a light source component to transfer light to whichever region currently focused upon by the laser and detection system (i.e., through focuser/deflector 115).

The light may come from any source able to generate a suitable illumination wavelength, such as visible light (including additional lasers or light from the laser beam 107 itself), infrared light, ultraviolet (UV) light, x-rays, etc. In particular, specific wavelengths may be used for specific purposes, for example, different colors of visible light may be used to assist in achieving detectable contrast between the entities 125 and the surface 120. Light sources may also be used in combination, such as multiple adjacent lights for different angles, lights from above and below the surface, etc., where each light source need not be the same wavelength, e.g., to increase contrast of the entities 125 under varying circumstances. Notably, depending upon the location and angle of the light source, three-dimensional contours of the surface 120 may also be used as entities 125. For instance, the entity may actually be a topographical change (ridges, troughs, peaks, valleys, etc.), rather than the surface simply being flat with markings (etchings, scribes, edges, lines, etc.) on it.

Figure 4D:
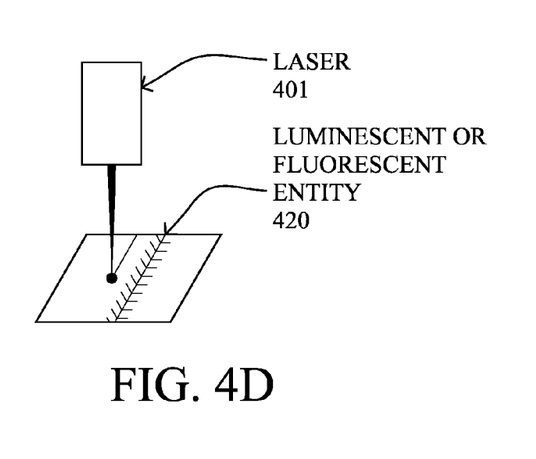

Additional techniques may be used to illuminate an entity or feature 125, such as having the entity itself supply the illumination. For example, as shown in FIG. 4D, the illumination incident on the surface 120 (e.g., from a light source 405/410/415) causes a contrast (420) in florescence or luminescence between the entity and the surface material. The florescent wavelength or luminescent (emission) wavelength may then be used for entity detection, whether detecting the illuminated entity (as shown), or a non-illuminated entity by comparison to the surrounding surface (not shown). For example, a fluorescent or luminescent surface may be scribed to remove the fluorescence or luminescence, leaving the non-illuminated entity for detection. Alternatively, the entity, e.g., a scribe or other depression in the surface, may be filled with a material (e.g., liquid, gel, powder, etc.) capable of either: a) florescence or luminescence under the influence of the illumination system or an electrical charge, or b) non-florescence or non-luminescence in the case where the surface itself is florescent or luminescent. Further visibly contrasting features, such as heat visible through an infrared camera, may also be used by the detection system, and those mentioned herein are merely representative examples, not meant to limit the scope of the present invention.

Figure 5:
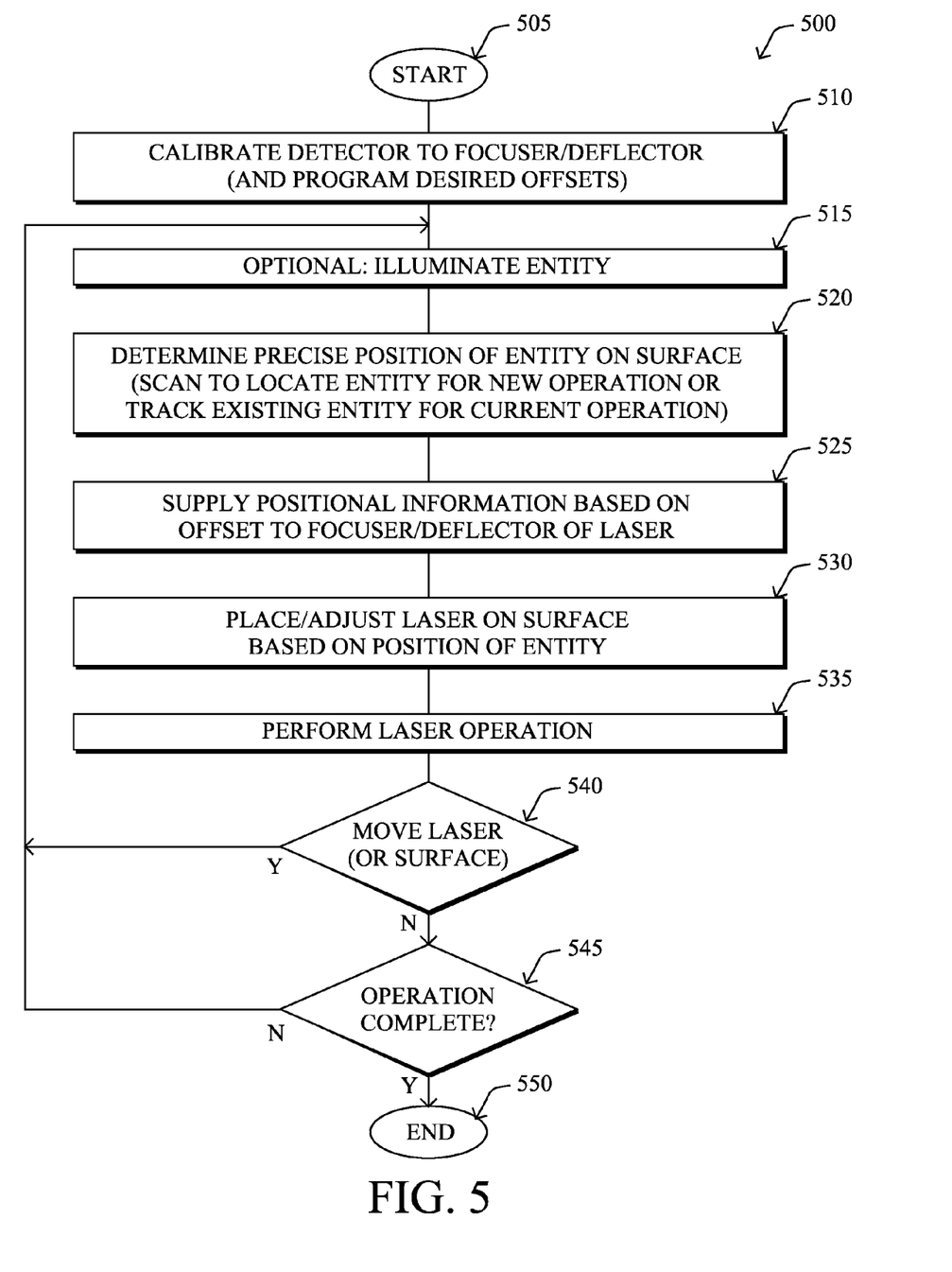
FIG. 5 illustrates a procedure for placing a laser beam with reference to an entity in accordance with the present invention.

FIG. 5 illustrates an example procedure for placing a laser beam with reference to an entity in accordance with the present invention. The procedure 500 starts at step 505, and continues to step 510, where a detector 130 is calibrated to a focuser/deflector 115, such as an initial physical configuration and/or a programmed (e.g., administrator-adjusted) configuration for desired offsets 350/355. Through optional entity illumination in step 515 as described above, such as where necessary or otherwise desired, the detector 130 may determine the precise position of the entity 125 on an object's surface 120. For instance, to initially determine the location for a new laser operation, the system 100 may scan the surface to locate the entity, e.g., based on a rough positioning estimate. Positional information based on the desired offset may be fed back to circuitry 116 controlling the focuser/deflector 115 in step 525, such that in step 530 the laser spot 118 may be placed (or adjusted) in the surface 120 relative to the entity 125. The laser operation (e.g., scribing, heating, cutting, etc.) may then be performed in step 535.

In response to a moving laser beam (relative to the surface) that is to follow an entity 125 in step 540, the procedure 500 returns to step 515 to track the entity for the current operation in a continual feedback loop as described above to perform the moving laser operation. As noted above, the feedback loop need not require that the positional determination and laser operation be performed simultaneously, but instead may involve separate positional determination passes and laser operation passes or time division techniques for pulsed lasers. Once the laser beam no longer needs to be moved for the operation (e.g., after a moving operation is completed, or where the laser is not moved for the operation for a single laser placement), then in step 545 it may be determined whether the operation is complete. If not, such as for additional laser operations (e.g., additional cuts, scribes, etc.), then the procedure 500 returns to step 515 to scan for a previous entity, for example, the immediately preceding entity created by the laser or the initial entity for use with a newly configured offset as noted above. If, on the other hand, the operation is complete in step 545, then the procedure 500 ends in step 550.

According to one example embodiment/use of the present invention, the entity detection can be used to determine the position of a previously formed scribe and place a subsequent scribe adjacent to it, closely spaced and without, regardless of the previous scribe's position on the surface. That is, in this embodiment, previously formed scribes may be tracked to place subsequent scribes adjacent to them at a small, constant offset distance without regard for the absolute location or shape of a previous scribe on the surface. In particular, this arrangement is particularly useful in the manufacture of solar panels, though it is also applicable to a variety of applications where features have to be created with precise relative locations.

For example, during operation, a first scribe or set of scribes may be placed on the surface based on a predetermined geometry, in the form of lines set apart from one another. When a subsequent scribe is to be created adjacent to an existing scribe, the detection system views the position of at least one of the previous scribes through the same optical path as the deflection system. The beam deflection system may then direct the laser beam/spot along a nominal path and its position is adjusted according to the feedback from the detector, allowing the deflection system to track or follow the previous scribe while making a subsequent scribe and maintaining the desired offset distance between the previously scribe and a scribe currently being formed.

Figure 6:
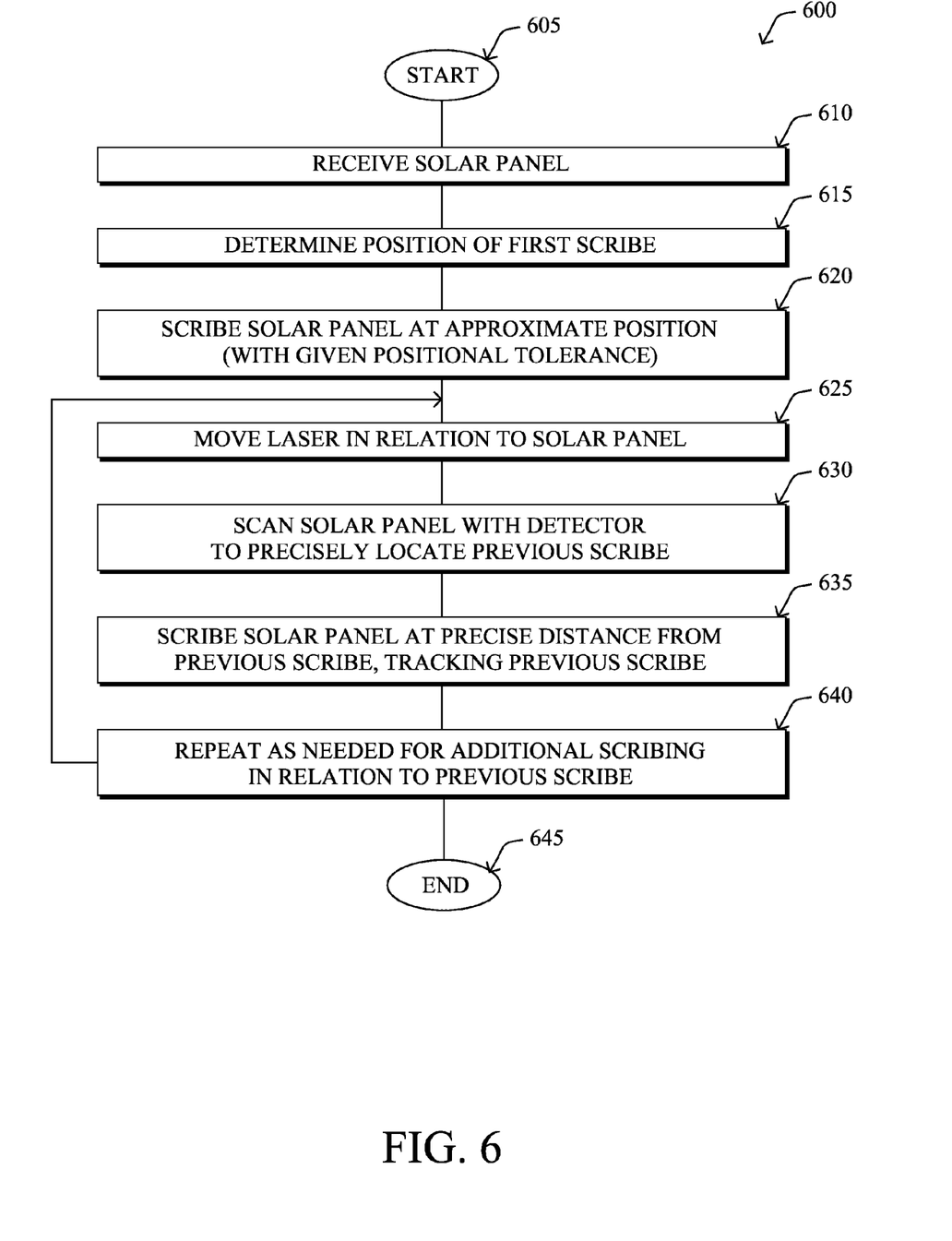
FIG. 6 illustrates a procedure for repeatedly scribing a surface such as a solar panel surface in accordance with the present invention.

FIG. 6 illustrates an example procedure for repeatedly scribing a surface such as a solar panel in accordance with an example embodiment of the present invention. The procedure 600 starts at step 605, and continues to step 610, where the surface object, illustratively a solar panel, is received into the laser beam placement system 100. The rough position of a first scribe is determined in step 615 (e.g., every centimeter along the surface), and the laser scribes the solar panel in step 620 at that approximate position, notably with a given positional tolerance, which is generally irrelevant given the techniques described herein and the following steps.

Upon completion of the first scribe, and possibly after (or during) intermediary manufacturing steps, e.g., coating the surface with a substrate, the laser may be moved in relation to the solar panel in step 625 (or, conversely, the solar panel may be moved in relation to the laser) in preparation for the next scribe. For that next scribe, in step 630 the surface of the solar panel is scanned by the detector to precisely locate the previous scribe. In particular, if the scribing laser had positional tolerances, the first scribe may be slightly displaced from the intended location. However, as noted above, the location of the first scribe is merely a rough placement on the solar panel, and the location of the subsequent scribes relative to the first scribe are of primary concern (that is, to keep them as close together as possible to maximize electrical production). Accordingly, by locating the previous scribe, in step 635 a second scribe may be etched into the surface at a precise distance (offset) from first scribe, tracking previous scribe and any variations it may make along its length. This process may be repeated for any additional scribes from step 640 to step 625 (e.g., a third scribe in relation to the second scribe, etc.), before ending in step 645. Note that the procedure 600 may be repeated for each set of scribes, starting with a first scribe of rough positioning, followed by subsequent related scribes of precise placement with respect to the first scribe.

Advantageously, as noted above, the techniques described herein precisely place laser beams on a surface relative to other entities on the surface, particularly to entities created by previous placements of the beams. That is, the precise placement of the laser beams is relative to the precisely detected location of an entity on the surface, using the same optical path to detect the entity and deflect the laser to minimize positional tolerance concerns, leaving less emphasis on the absolute location of the entity and laser on the surface.

While there have been shown and described illustrative embodiments that place laser beams on a surface relative to other entities on the surface, it is to be understood that various other adaptations and modifications may be made within the spirit and scope of the present invention. For example, the embodiments have been shown and described herein with reference to particular types of optics, lasers, uses, and objects/surfaces. However, the embodiments of the invention in their broader sense are not so limited, and may, in fact, be used with other suitable devices and their uses where the focus and deflection path can be used for detection in the reverse direction, and other uses. Also, the term "surface" is used generally as a focal point for the laser and the detected entity, and does not limit the focal point to an exterior portion of an object (e.g., focusing the laser and detecting the entity from within the interior of an object, such as glass, certain plastics, or other transparent material). Further, while the above description is generally directed to tracking an entity with a moving laser at a desired offset (e.g., in parallel), it should be noted that certain embodiments may be used to place singular or multiple laser spots in relation to entities, and need not specifically trace an entire entity as it appears on a surface. Moreover, while the above description generally describes placing a laser spot at an offset from a detected entity, embodiments herein may also place the laser spot on the detected entity, such as for an exact trace of the entity by the laser.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A laser scribing system for modifying or removing material from a surface, said system comprising:
    a laser beam focusing and deflection system configured to direct a laser beam through an optical path to place a laser scribing spot onto a surface;
    an optical detection system including a detector and configured to detect an existing feature on the surface as viewed through the optical path of the deflection system and to provide a focused trace along the length of the feature, and
    a feedback circuit configured to provide substantially instantaneous feedback on said trace to the deflection system, said deflection system being further configured to move the laser scribing spot in fixed in relation to the trace based on the provided feedback while the laser scribing spot scribes a subsequent feature on the surface that is substantially identical to and tracks along the length of the existing feature in real time.

2. The system as in claim 1 wherein the existing feature is a first scribed line and the subsequent feature is a second scribed line closely spaced parallel to the first scribed line.

3. The system as in claim 1 wherein the deflection system is configured to offset the laser scribing spot a selected distance from the existing feature.

4. The system as in claim 3 wherein the deflection system is configured to successively offset the laser scribing spot from the existing feature a plurality of times based on the provided feedback, each offset being quantitatively different from the others.

5. The system as in claim 1 wherein the existing feature is created by a previous placement of the laser scribing spot.

6. The system as in claim 1 and further comprising a light source configured to illuminate the surface to generate a detectable contrast between the existing feature and the surface.

7. The system as in claim 6 wherein the light source is configured to illuminate the surface by one of: direction of illumination through said optical path, direction of illumination from a location adjacent to the optical path, and, where the surface is transparent, direction of illumination from behind the surface and through the surface to the optical detection system.

8. The system as in claim 6 wherein the illumination of the surface causes florescence, and wherein the optical detection system is further configured to detect the existing feature based on an emission wavelength of said florescence.

9. The system as in claim 8 wherein the florescence is from either the surface or the existing feature on the surface.

10. The system as in claim 1 wherein the existing feature contains a luminescent material whose emission wavelength is detectable by the detector when the existing feature is exposed to light from the light source.

11. The system as in claim 1, wherein the detector is selected from the group consisting of a photodiode, a split cell photodiode, a quad cell photodiode, and a line scan camera.

12. The system as in claim 1 and further comprising an optical isolating device in said optical path to inhibit light from the laser beam and any stray light from being detected by the detector.

13. The system as in claim 12 wherein the isolating device is selected from the group consisting of an optical wavelength filter, a dichroic mirror and a spatial filter.

14. The system as in claim 1 wherein where the feedback circuit is configured to provide feedback as either an analog signal or a digital signal.

15. The system as in claim 1 and further comprising:
    a plurality of said independent laser beam focusing and deflection systems, each configured to direct a respective laser beam to the surface, and
    a corresponding plurality of said feedback circuits, each configured to provide independent feedback to a corresponding deflection system based on one or more of the existing features on the surface.

16. The system as in claim 15 and further including a mechanism for moving the surface based on the provided feedback to advance the existing feature opposite at least one or more of the said plurality of systems.

17. A laser scribing method for modifying or removing material from a surface, said method comprising the steps of:
    directing a deflectable laser beam through an optical path to place a laser scribing spot onto said surface;
    detecting an existing feature on said surface as viewed through the optical path and providing a focused trace along the length of the feature, and
    controllably deflecting the laser beam in accordance with feedback provided from the trace to move the laser scribing spot in fixed relation to the trace so that the laser scribing spot scribes a subsequent feature on the surface that is substantially identical to and that tracks along the length of the existing feature in real time.

18. The method as in claim 17 wherein the existing and subsequent features are formed as scribed lines closely spaced parallel to each other.

19. The method as in claim 17, wherein the detecting is performed using an optical detector selected from the group consisting of: a photodiode, a split cell photodiode, a quad cell photodiode, and a line scan camera.

20. The method as in claim 17, including the step of:
illuminating the surface to produce a detectable contrast between the existing feature and the surface.

21. The method as in claim 20, wherein the illuminating is accomplished by one of: directing illumination through the optical path, directing illumination from a location adjacent to the optical path, and, where the surface is transparent, directing illumination from behind the surface and through the surface.

22. The method as in claim 20 including the step of forming the surface or the existing feature to include a luminescent or fluorescent material, and
detecting the existing entity based on an emission wavelength of said material.

23. The method as in claim 17 including the step of filling the existing entity with a luminescent material or a florescent material.

24. The method as in claim 17, including the additional step of inhibiting the detection of light other than light of a predetermined wavelength reflected from the surface or the existing feature.

* * * * *

UNITED STATES PATENT AND TRADEMARK OFFICE
CERTIFICATE OF CORRECTION

PATENT NO. : 8,680,429 B2  
APPLICATION NO. : 12/942493  
DATED : March 25, 2014  
INVENTOR(S) : Brian Patrick Stokes et al.

Page 1 of 1

It is certified that error appears in the above-identified patent and that said Letters Patent is hereby corrected as shown below:

In the Specification:  
Col. 4, line 25 should read:  
~~deflection system (e.g., each minor or other optical device),~~  
deflection system (e.g., each mirror or other optical device), Col. 5, line 63 should read:  
~~an "X mirror" 212 and a "Y minor" 214 to direct a laser beam~~  
an "X mirror" 212 and a "Y mirror" 214 to direct a laser beam Col. 6, line 5 should read:  
~~dimensional x-y scanning mechanism (e.g., minors) 222 may~~  
dimensional x-y scanning mechanism (e.g., mirrors) 222 may Signed and Sealed this  
Twelfth Day of August, 2014

Michelle K. Lee  
*Deputy Director of the United States Patent and Trademark Office*